United States Patent
Van den Sype

(10) Patent No.: US 6,168,774 B1
(45) Date of Patent: *Jan. 2, 2001

(54) COMPACT DEOXO SYSTEM

(75) Inventor: Jaak Stefaan Van den Sype, Katonah, NY (US)

(73) Assignee: Praxair Technology, Inc., Danbury, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/908,166

(22) Filed: Aug. 7, 1997

(51) Int. Cl.⁷ .......................... C01B 21/04; B01D 53/22
(52) U.S. Cl. ..................... 423/351; 423/219; 95/52; 95/130
(58) Field of Search .................... 423/219, 351; 95/52, 130, 138, 96; 96/9

(56) References Cited

U.S. PATENT DOCUMENTS

| | | | |
|---|---|---|---|
| 1,588,258 | * 6/1926 | Metzger | 423/219 |
| 2,384,065 | * 9/1945 | Balcar | 423/219 |
| 2,582,885 | * 1/1952 | Rosenblatt | 423/351 |
| 4,472,528 | * 9/1984 | Berg et al. | 502/220 |
| 4,536,488 | * 8/1985 | Wanke et al. | 502/159 |
| 4,859,435 | * 8/1989 | Roberts et al. | 423/219 |
| 4,931,070 | 6/1990 | Prasad | 55/16 |
| 5,004,482 | 4/1991 | Haas et al. | 55/16 |
| 5,057,164 | 10/1991 | Nilsson et al. | 148/16 |
| 5,069,728 | 12/1991 | Rancon et al. | 148/16 |
| 5,078,798 | * 1/1992 | Nicolson et al. | 134/7 |
| 5,122,355 | 6/1992 | Prasad et al. | 423/351 |
| 5,202,057 | * 4/1993 | Nicholas et al. | 252/376 |
| 5,238,670 | 8/1993 | Louise et al. | 423/351 |
| 5,348,592 | 9/1994 | Garg et al. | 148/208 |
| 5,695,731 | 12/1997 | Domergue et al. | 423/351 |

FOREIGN PATENT DOCUMENTS

| | | | |
|---|---|---|---|
| 2729583 | 7/1996 | (FR) | |
| 46-6481 | * 2/1971 | (JP) | 423/219 |
| 62-22923 | * 5/1987 | (JP) | 423/219 |

OTHER PUBLICATIONS

Babor, "Basic College Chemistry", 2nd, Edition, pp. 255–261, 1953, (No Month).*

* cited by examiner

*Primary Examiner*—Ngoc-Yen Nguyen
(74) *Attorney, Agent, or Firm*—Donald T. Black

(57) ABSTRACT

A small system for efficiently producing low flow rates of a nitrogen or nitrogen/hydrogen stream from an initial feed which also contains oxygen, employing a defined catalytic reactor unit producing product at very high space velocities.

7 Claims, 1 Drawing Sheet

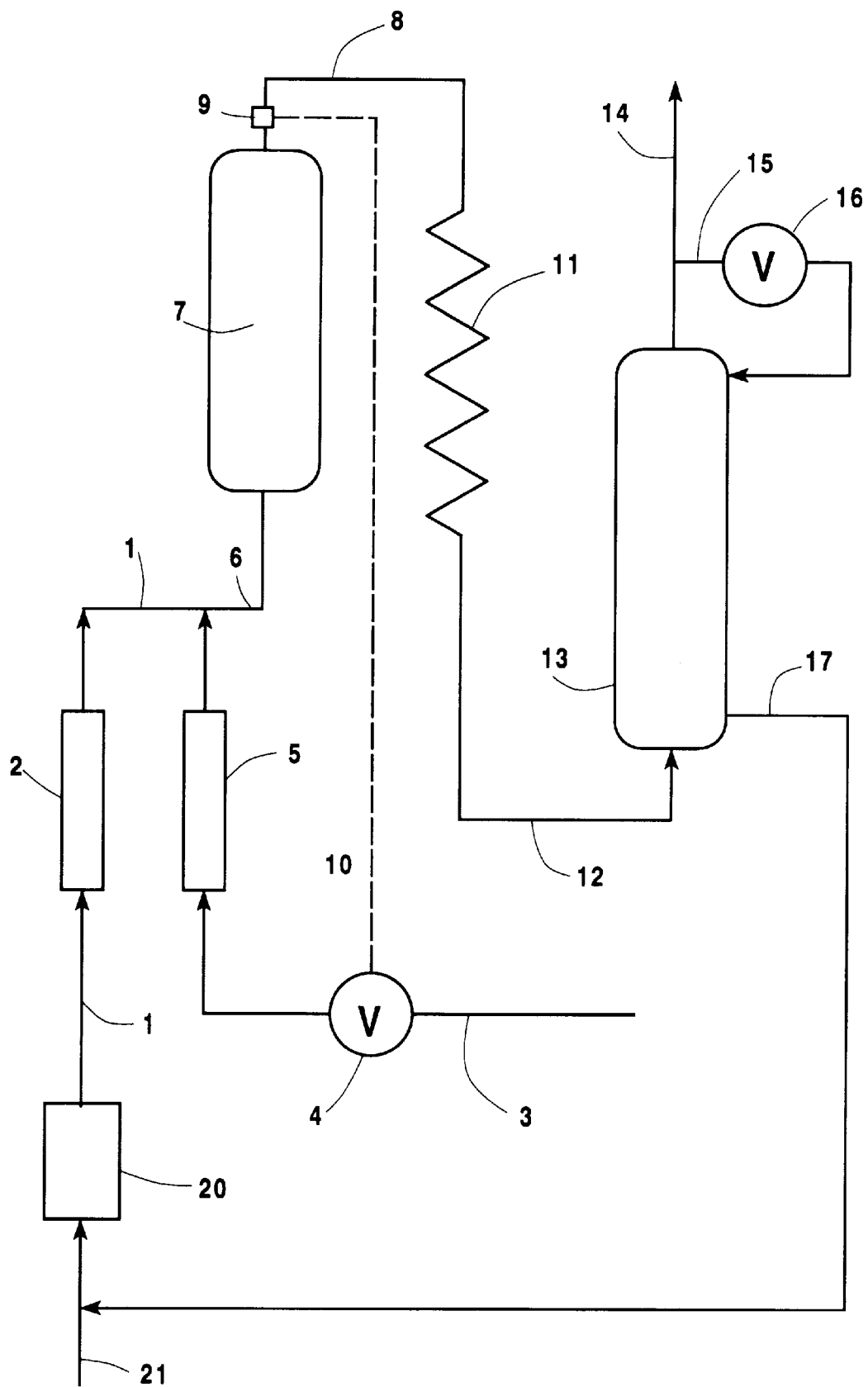

COMPACT DEOXO SYSTEM

TECHNICAL FIELD

This invention relates to the production of an oxygen-free stream of nitrogen, optionally containing hydrogen, such as may be used in a heat treating furnace.

BACKGROUND ART

Nitrogen or nitrogen/hydrogen atmospheres are used in many heat treating systems. It is important that oxygen not be present in the heat treating atmosphere as this will have a deleterious effect on the articles being treated. One way of providing a nitrogen or nitrogen/hydrogen stream into a heat treating furnace which is free of oxygen is to provide pure nitrogen, or mix pure hydrogen with pure nitrogen, produced by the cryogenic separation of air, and pass this stream to the heat treating system. While this method is effective, it is also quite expensive.

Nitrogen having a modest oxygen concentration can be produced at somewhat lower cost using non-cryogenic air separation methods such as adsorption or membrane separation systems. The oxygen is removed by reacting it with hydrogen in a catalytic reactor to form water. Excess hydrogen is used to establish a nitrogen/hydrogen stream if such is desired. However, such systems operate efficiently only at flowrates exceeding about 10,000 standard cubic feet per hour (SCFH) because for small systems having capacities less than about 10,000 SCFH, the advantages of using relatively inexpensive impure nitrogen are nullified by the expense of the deoxo system. Typical heat treating systems have atmosphere flowrate requirements within the range of from 1,000 to 8,000 SCFH.

Accordingly, it is an object of this invention to provide a system for economically producing an oxygen-free nitrogen stream, which can optionally contain hydrogen, and which can operate efficiently at flowrates less than 10,000 SCFH.

SUMMARY OF THE INVENTION

The above and other objects, which will become apparent to one skilled in the art upon a reading of this disclosure, are attained by the present invention, one aspect of which is:

A method for producing an oxygen-free nitrogen product stream comprising:

(A) providing an initial stream comprising nitrogen in a concentration of at least 98 mole percent and oxygen in a concentration within the range of from 0.1 to 2.0 mole percent, and passing hydrogen into said initial stream to form a reactor feed stream having a hydrogen concentration within the range of from 2 to 20 times that of the oxygen concentration but not more than twice the oxygen concentration plus 4 mole percent;

(B) passing the reactor feed stream into a catalytic reactor containing a catalyst bed comprising noble metal having a specific surface area exceeding 1 $m^2$/gram on a ceramic carrier having a specific surface area exceeding 100 $m^2$/gram;

(C) reacting hydrogen with essentially all of the oxygen in the reactor feed stream within the catalytic reactor to form water; and (D) withdrawing a water-containing, oxygen-free nitrogen product stream from the catalytic reactor at a space velocity of at least 50,000/hr.

Another aspect of the invention is:

Apparatus for producing an oxygen-free nitrogen product stream comprising:

(A) means for providing an initial stream comprising nitrogen and oxygen;

(B) means for passing hydrogen into said initial stream to form a reactor feed stream;

(C) a catalytic reactor containing a catalyst bed comprising noble metal having a specific surface area exceeding 1 $m^2$/gram on a ceramic carrier having a specific surface area exceeding 100 $m^2$/gram; and (D) means for passing the reactor feed stream into the catalytic reactor, and means for withdrawing a product stream from the catalytic reactor at a space velocity of at least 50,000/hr.

As used herein the term "specific surface area" means (a) for the carrier, the surface area in $m^2$ per gram of catalyst; the surface area being measured by the physical adsorption of nitrogen gas on the catalyst surface using the conventional BET analysis as described in "Characterization of Catalysts" by J. M. Thomas and R. M. Lambert published by John Wiley, 1980 see p. 17 ff; and (b) for the noble metal, the surface area in $m^2$ per gram of catalyst; the noble metal surface area being measured by the chemisorption of hydrogen on the metal surface as described in "Characterization of Heterogeneous Catalysts" by Francis Delannay published by Marcel Dekker, 1984 see p. 310 ff.

As used herein the term "noble metal" means one or more of platinum, rhodium, ruthenium, iridium, osmium and palladium. Platinum and rhodium are preferred.

As used herein the term "ceramic" means one or more of alumina, zirconia, titania, magnesia and silica. Gamma-alumina is preferred.

As used herein the term "oxygen-free" means having an oxygen concentration less than 10 parts per million (ppm).

As used herein the term "space velocity" means the flowrate in SCFH of gas exiting a catalytic reactor per cubic foot of catalyst bed in the catalytic reactor.

BRIEF DESCRIPTION OF THE DRAWING

The sole FIGURE is a simplified schematic representation of one preferred embodiment of the compact deoxo system of this invention.

DETAILED DESCRIPTION

The invention will be described in detail with reference to the Drawing. Referring now to the FIGURE, initial stream 1 comprises nitrogen in a concentration of at least 98 mole percent and generally in a concentration within the range of from 98 to 99.9 mole percent, and oxygen in a concentration within the range of from 0.1 to 2.0 mole percent. Generally initial stream 1 has a flowrate within the range of from 500 to 10,000 SCFH. Initial stream 1 is preferably the product of a membrane separation unit, such as unit 20 shown in the FIGURE, wherein a feed stream 21 comprising oxygen and nitrogen, e.g. air, is passed through polymer membrane bundles. The nitrogen and oxygen diffuse through the membranes at different rates resulting in the production of a nitrogen-enriched product and an oxygen-enriched waste stream. Those skilled in the art of air separation are familiar with membrane air separation units and their operation. Initial stream 1 may also be from any other suitable source such as the product of an adsorption air separation unit.

Initial stream 1 is passed through metering device or flow meter 2. Hydrogen stream 3 is passed through valve 4 and then through metering device or flow meter 5 and combined with initial stream 1 to form reactor feed stream 6. Hydrogen stream 3 may be from any suitable source of hydrogen and generally has a hydrogen purity of at least 99 mole percent. Hydrogen stream 3 is passed into initial stream 1 at a flowrate so as to provide reactor feed stream 6 with a hydrogen concentration within the range of from 2 to 20 times, preferably from 2 to 6 times, that of the oxygen concentration in reactor feed stream 6, provided that the mole percent of hydrogen in the reactor feed stream does not exceed twice the oxygen concentration plus 4 mole percent. This ensures that the hydrogen concentration in the product stream will not exceed 4 mole percent and that the flow streams into and out of the reactor remain in the non-flammable range.

Reactor feed stream 6 is passed into catalytic reactor 7 which contains a catalyst bed comprising noble metal on a ceramic carrier. The catalyst bed generally has a volume less than 0.2 cubic feet and preferably has a volume within the range of from 0.0025 to 0.01 cubic feet for a reactor output rating of 500 SCFH, and within the range of from 0.05 to 0.2 cubic feet for a reactor output rating of 10,000 SCFH. The noble metal has a specific surface area exceeding 1 $m^2$/gram and preferably has a specific surface area up to 2 $m^2$/gram. The ceramic carrier has a specific surface area exceeding 100 $m^2$/gram and preferably has a specific surface area up to 300 $m^2$/gram.

Within catalytic reactor 7 hydrogen reacts with essentially all of the oxygen in the reactor feed stream to form water. The temperature of reactor feed stream 6 should be at least 70° F. to ensure efficient catalytic reaction of the hydrogen with the oxygen.

A product stream is withdrawn from catalytic reactor 7 in line 8 at a space velocity of at least 50,000/hour and generally within the range of from 50,000 to 200,000/hour. The very high space velocities that are achievable with this invention enable a reactor design or deoxo unit that is very compact and inexpensive. For a system having a 2,000 SCFH flow capacity, an operating space velocity of 100,000/hour uses a catalyst volume of only 0.02 cubic foot. This catalyst volume can be easily fitted in a 2 inch diameter pipe less than 1 foot long. The reactor can therefore be readily inserted in the nitrogen piping with minimal cost. If the reactor is located outside, the required 70° F. startup temperature may be achieved using a small band heater around the reactor. The operating temperature of the reactor is higher than this startup temperature since, at the high space velocities used, the reactor operates adiabatically and the hydrogen-oxygen reaction is highly exothermic. The exact operating temperature will depend on the oxygen concentration in the reactor feed. The following lists the observed temperature rise in the reactor for certain oxygen concentrations in the reactor feed stream:

| Oxygen Concentration Mole % | Temperature Rise ° F. |
|---|---|
| 0.2 | 135 |
| 0.5 | 225 |
| 1.0 | 375 |

The product stream in line 8 comprises nitrogen, and water and is oxygen-free. It may also contain hydrogen. Preferably, as illustrated in the FIGURE, oxygen probe 9 is inserted in line 8 to measure the oxygen concentration in line 8. Oxygen probe 9 operates valve 4 by means of electrical signal line 10 and will adjust valve 4 to be more open or more closed to ensure a hydrogen flow into the catalytic reactor which will result in oxygen-free effluent in line 8 from catalytic reactor 7.

The nitrogen in product stream 8 is the nitrogen which was passed into catalytic reactor 7 in reactor feed stream 6. Hydrogen, if any, in product stream 8 is excess hydrogen which was passed into catalytic reactor 7 in reactor feed stream 6 and which did not react with the oxygen within catalytic reactor 7. The water in product stream 8 is the water formed by the reaction of oxygen and hydrogen within catalytic reactor 7. If desired, product stream 8 may then be passed directly to a use point such as a heat treating furnace. An atmosphere of nitrogen with small amounts of hydrogen, generally less than 4 mole percent, constitutes an ideal, non-toxic and non-flammable atmosphere for many heat treating applications. Nitrogen is the inert component and protects steel alloys and other non-ferrous metals from oxidation during heat treatment cycles. Hydrogen is a reactive component in the atmosphere and has many beneficial effects, such as protecting steels from oxidation in the event of small inleaks of air into industrial furnaces because the oxygen in the air will immediately react with the hydrogen to form water. Moreover, hydrogen in the furnace atmosphere will generally result in a cleaner, brighter product because the hydrogen reduces residual oxides on the parts being heat treated and also aids the removal of residual oils and lubricants on the parts.

In some situations it may be desirable to remove the water from product stream 8 before it is passed on to the use point. One preferred system for removing this water, which employs a membrane dryer, is illustrated in the FIGURE.

Referring back now to the FIGURE, product stream 8, which is at an elevated temperature owing to the exothermic nature of the reaction of the hydrogen and oxygen in catalytic reactor 7, is cooled to about 100° F. by passage through cooler 11 such as by indirect heat exchange with cooling water. Resulting cooled stream 12 is passed into membrane dryer 13 wherein water vapor within stream 12 diffuses through membranes and is swept away by sweep gas passing on the other side of the membrane to form a permeate gas stream. The remaining dry nitrogen or nitrogen/hydrogen product stream 14 is then passed on to the use point. Those skilled in the art of removing moisture from gas streams are familiar with membrane dryers and their operation. Other drying systems, such as adsorbent drying systems, may also be used to dry the product gas stream in the practice of this invention.

The FIGURE illustrates a preferred embodiment of the invention wherein a portion of the dry product gas from the membrane dryer is used as the sweep gas.

Referring back now to the FIGURE, a portion 15 of dry product stream 14 is passed through valve 16 and then as sweep gas into membrane dryer 13. As the sweep gas passes through dryer 13, it picks up the moisture which diffuses through the membrane. After the sweep gas completes the traverse of membrane dryer 13 it is withdrawn from dryer 13 as permeate stream 17. Preferably, permeate stream 17 is passed into the feed stream 21 of the membrane separation unit 20 which serves to produce initial stream 1. Catalytic reactor 7 typically operates at a pressure of 100 pounds per square inch gauge (psig) or higher. Nitrogen produced by a membrane separation unit is produced at about 170 psig and high pressure operation is advantageous in keeping pipe sizes small and is also advantageous if a membrane drying unit is used because the higher is the partial pressure difference of water across the drying membrane, the higher is the drying efficiency.

Table 1 lists the results of four examples of the invention carried out with a system similar to that illustrated in the FIGURE. The catalyst bed had a volume of 0.014 cubic feet and comprised platinum having a specific surface area of 1.85 $m^2$/gram on alumina carrier having a specific surface area of 165 $m^2$/gram. The product was withdrawn from the catalytic reactor at a space velocity of 62,500/hr. The stream numerals in Table 1 correspond to those of the FIGURE.

The examples are provided for illustrative purposes are not intended to be limiting.

TABLE 1

|  | Ex. 1 | Ex. 2 | Ex. 3 | Ex.4 |
| --- | --- | --- | --- | --- |
| Stream 1 (SCFH) | 875 | 875 | 875 | 875 |
| Stream 1 ($O_2$ conc. mole %) | 0.2 | 0.5 | 0.7 | 1.0 |
| Stream 6 ($H_2$ conc. mole %) | 0.4 | 1.0 | 1.2 | 2.0 |
| Stream 8 (Dew point ° C.) | −13 | 3 | 9 | 11 |
| Stream 14 (Dew point ° C.) | −25 | −25 | −22 | −16 |
| Stream 14 ($O_2$ conc. ppm) | 4 | 3.7 | 4 | 3.9 |

Now by the use of this invention one can efficiently produce a stream of nitrogen and hydrogen at relatively low flowrates using a defined catalytic reactor system which can produce product gas space velocities significantly higher than any attainable with known systems. Although the invention has been described in detail with reference to a certain preferred embodiment, those skilled in the art will recognize that there are other embodiments of the invention within the spirit and the scope of the claims.

What is claimed is:

1. A method for producing an oxygen-free nitrogen product stream comprising:
   (A) providing an initial stream comprising nitrogen in a concentration of at least 98 mole percent and oxygen in a concentration within the range of from 0.1 to 2.0 mole percent, and passing hydrogen into said initial stream to form a reactor feed stream having a hydrogen concentration within the range of from 2 to 20 times that of the oxygen concentration but not more than twice the oxygen concentration plus 4 mole percent;
   (B) passing the reactor feed stream into a catalytic reactor containing a catalyst bed comprising noble metal having a specific surface area exceeding 1 $m^2$/gram on a ceramic carrier having a specific surface area exceeding 100 $m^2$/gram;
   (C) reacting hydrogen with essentially all of the oxygen in the reactor feed stream within the catalytic reactor at a pressure of 100 pounds per square inch gauge or higher to form water; and
   (D) withdrawing a water-containing, oxygen-free nitrogen product stream from the catalytic reactor at a space velocity of at least 50,000/hr.

2. The method of claim 1 wherein the catalyst bed has a volume less than 0.2 cubic feet.

3. The method of claim 1 wherein the product stream additionally comprises hydrogen.

4. The method of claim 1 further comprising removing water from the product stream.

5. The method of claim 4 wherein the initial stream is from a membrane separation unit, water is removed from the product stream by passing the product stream through a membrane dryer to generate a permeate stream, and the permeate stream is recycled to the membrane separation unit.

6. A method for producing an oxygen-free nitrogen product stream comprising:
   (A) providing an initial stream comprising nitrogen in a concentration of at least 98 mole percent and oxygen in a concentration within the range of from 0.1 to 2.0 mole percent, and passing hydrogen into said initial stream to form a reactor feed stream having a hydrogen concentration within the range of from 2 to 20 times that of the oxygen concentration but not more than twice the oxygen concentration plus 4 mole percent;
   (B) passing the reactor feed stream into a catalytic reactor containing a catalyst bed which has a volume less than 0.2 cubic feet and comprises at least one of platinum and rhodium having a specific surface area exceeding 1 $m^2$/gram on a ceramic carrier having a specific surface area exceeding 100 $m^2$/gram;
   (C) reacting hydrogen with essentially all of the oxygen in the reactor feed stream within the catalytic reactor at a pressure of 100 pounds per square inch or higher to form water; and
   (D) withdrawing a water-containing, oxygen-free nitrogen product stream from the catalytic reactor at a space velocity of at least 50,000/hr.

7. A method for producing an oxygen-free nitrogen product stream comprising:
   (A) providing an initial stream from a membrane separation unit comprising nitrogen in a concentration of at least 98 mole percent and oxygen in a concentration within the range of from 0.1 to 2.0 mole percent, and passing hydrogen into said initial stream to form a reactor feed stream having a hydrogen concentration within the range of from 2 to 20 times that of the oxygen concentration but not more than twice the oxygen concentration plus 4 mole percent;
   (B) passing the reactor feed stream into a catalytic reactor containing a catalyst bed comprising noble metal having a specific surface area exceeding 1 $m^2$/gram on a ceramic carrier having a specific surface area exceeding 100 $m^2$/gram;
   (C) reacting hydrogen with essentially all of the oxygen in the reactor feed stream within the catalytic reactor at a pressure of 100 pounds per square inch gauge or higher to form water;
   (D) withdrawing a water-containing, oxygen-free nitrogen product stream from the catalytic reactor at a space velocity of at least 50,000/hr; and
   (E) removing water from the product stream by passing the product stream through a membrane dryer to produce dry product gas by passing the water from the product stream into a sweep gas, using a portion of the dry product gas as said sweep gas to generate a permeate stream, and recycling the permeate stream to the membrane separation unit.

* * * * *